(No Model.)
J. S. MARSHALL.
GRAIN WEIGHING AND REGISTERING APPARATUS.
No. 346,668. Patented Aug. 3, 1886.
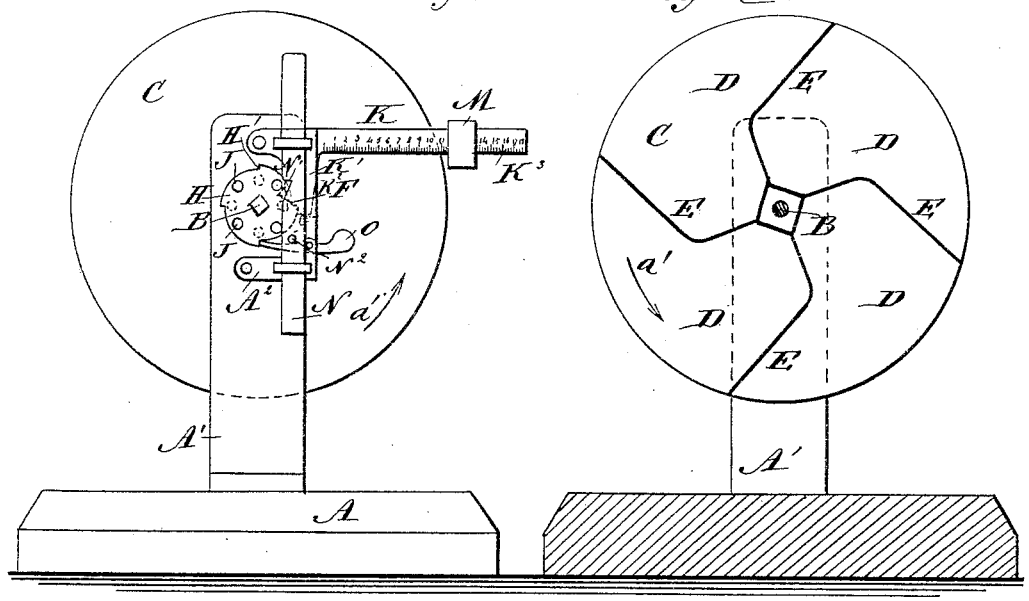
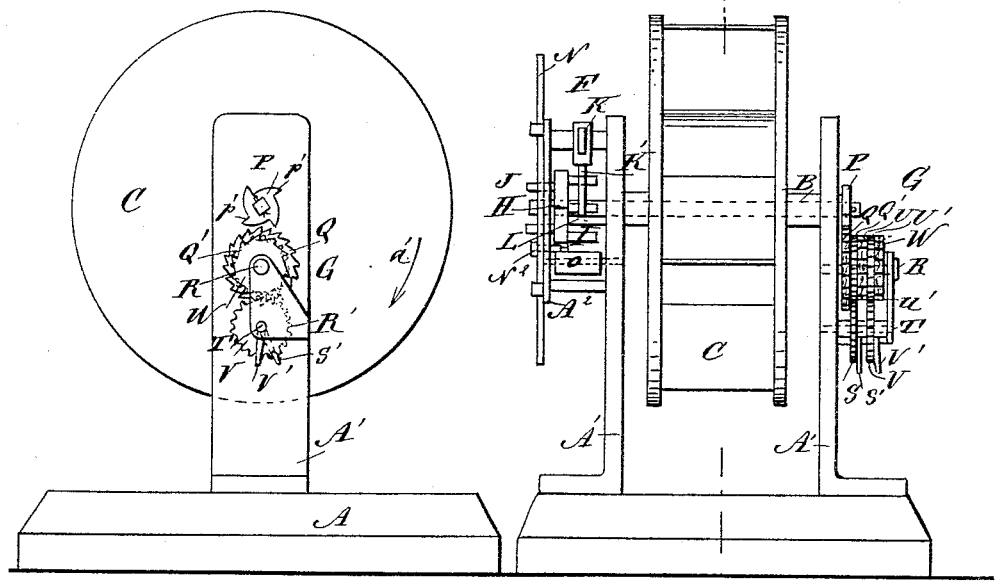
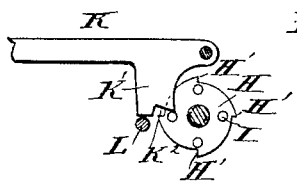
WITNESSES:
C. Neveux
C. Sedgwick
INVENTOR:
J. S. Marshall
BY Munn & Co
ATTORNEYS.

UNITED STATES PATENT OFFICE.

JOSEPH STANLEY MARSHALL, OF CLEAR WATER, KANSAS.

GRAIN WEIGHING AND REGISTERING APPARATUS.

SPECIFICATION forming part of Letters Patent No. 346,668, dated August 3, 1886.

Application filed February 10, 1886. Serial No. 191,493. (No model.)

*To all whom it may concern:*

Be it known that I, JOSEPH STANLEY MARSHALL, of Clear Water, in the county of Sedgwick and State of Kansas, have invented a new and Improved Weighing and Registering Machine, of which the following is a full, clear, and exact description.

The object of my invention is to provide a new and improved weighing and registering machine for weighing the grain as fast as it is delivered from the thrashing-machine and discharging the weighed grain automatically.

The invention consists of a measuring-wheel, into which the grain is discharged by an elevator from the thrashing-machine, of a device for weighing the grain in the wheel, and of a device for registering the grain weighed.

The invention also consists in various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a side elevation of one side of my improvement. Fig. 2 is a longitudinal vertical section of the same on the line $x\ x$, Fig. 4. Fig. 3 is an elevation of the rear of my improvement. Fig. 4 is an end view of the same. Fig. 5 is a detail view of part of my improvement.

The base-plate A is provided with standards A' A', between which is mounted on the shaft B the receiving-wheel C, having four pockets, D, formed by angular partitions E. The shaft B projects beyond each standard A', and operates on one side the weighing device F, and on the other side the registering mechanism G.

The weighing device F consists of the notched disk H, fastened to the shaft B and provided on each face with a set of four pins or lugs, I and J, of which the pins I on the inner face of the disk H are in alternating position with the pins J on the outside face of the disk H. The scale-beam K is pivoted at one end to one of the standards A', and is provided with a downwardly-projecting lug, K', having a shoulder, K², which rests on one of the pins I or on the cross-bar L, attached to the standard A'. The scale-beam K is provided with the graduations K³, and the scale-weight M is adjustable on said beam K. A drop-bolt, N, placed in suitable bearings on the frame A², attached to the standard A', is provided with a notched shoulder, N', which engages with the pins J on the outer face of the disk H and with the inwardly-projecting lug N², which passes over the upper face of the weighted pawl O, pivoted to the frame A², which engages with the notches H', cut in the periphery of the disk H.

The operation of the weighing device is as follows: The pockets D in the receiving-wheel C are placed in such a relative position to the pins I on the face of the disk H that the wheel is held in place by the weighing-beam K, its lug resting on one of the pins I, and the weight being set to weigh the desired amount of grain. When the pocket D is filling with grain, the pressure of the pin I on the lug K' of the weighing-beam K increases until the desired weight is reached, so that the pin I will lift the weighing-beam and the receiving-wheel C can rotate in the direction of the arrow $a'$ until the pawl O engages the next notch H' in the disk H, whereby the motion of the wheel C is for a moment interrupted until the bolt N, which had been carried upward by one of the pins J on the outer face of the disk H during the revolution of the wheel C, drops down, and its lug N², striking the face of the pawl O disengages the same from its respective notch H' in the disk H. The momentary interruption of the motion of the wheel prevents the latter from coming with too great force against the weighing-beam, which, if not prevented, would cause the weighing-beam to be lifted again and allow the wheel to make two turns instead of one. The grain is in the meanwhile discharged from its respective pocket D, and the next one is filled as before, the lug K' of the weighing-beam K resting against the next pin I. When this pocket has been filled, the same operation takes place as before described, each pocket being filled until the amount set by the weight M on the scale-beam K is reached, and the wheel C, making one-quarter of a revolution, discharging the grain and bringing the next pocket into position for being filled.

The registering device G consists of a wheel, P, having four shoulders or notches, p', which engage a ratchet-wheel, Q, to which is attached a gear-wheel, Q', both mounted loosely on the shaft R, placed in suitable bearings on the frame R', secured to the other standard, A'. The gear-wheel Q' meshes into the gear-wheel S, provided with an arm, S', and mounted loosely on a shaft, T, in the frame R'. The arm S' engages, at every revolution of the gear-wheel S, with a notch on the ratchet-wheel U, turning loosely on the shaft R, and provided with the gear-wheel U', and turns the same the distance of one tooth or notch. The gear-wheel U' meshes into the gear-wheel V, mounted loosely on the shaft T and provided with an arm, V', which engages at every revolution of the gear-wheel V with a notch in the ratchet-wheel W, and turns the same the distance of one notch. Suitable springs hold the ratchet-wheels in place until turned by their respective arms S' and V'.

The operation of the registering device is as follows: At every quarter of a revolution of the receiving-wheel C the wheel P turns the ratchet-wheel Q one notch. For every complete revolution of the ratchet-wheel Q and its gear-wheel Q' one revolution is given to the gear-wheel S and its pawl S', the latter moving the ratchet-wheel U one notch, so that, according to the number of teeth in the gear-wheels Q' and S', the arm S' has to make a certain number of revolutions in order to give one complete revolution to the ratchet-wheel U. The same takes place with each complete revolution of the gear-wheels U' and V, and the arm V', moving the ratchet-wheel W one notch at every revolution, so that any number of revolutions of the receiving-wheel C will be registered in units, tens, and hundreds on the ratchet-wheels Q', U', and W.

The grain to be weighed is taken directly from the thrashing-machine by means of elevator-buckets to the upper pocket of the receiving-wheel, and the grain is discharged from the receiving-wheel into a spout or other suitable contrivance, which conveys it to a wagon or receptacle.

Having thus fully described my invention, I claim as new and desire to secure by Letters Patent—

1. The receiving-wheel C, provided with the pockets D, formed by the angular partitions E, and mounted on the shaft B, in combination with the notched disk H, having the pins I and J, the weighing-beam K, the drop-bolt N, having the lug $N^2$, and the weighted pawl O, engaging said lug $N^2$, substantially as herein shown and described.

2. The receiving-wheel C, mounted on the shaft B, and the disk H, provided with the pins I, in combination with the weighing-beam K, having the notched lug K' and the weight M, substantially as herein shown and described.

3. The receiving-wheel C, the shaft B, and the disk H, provided with the pins I and J, in combination with the weighing-beam K, having the notched lug K' and the lug $N^2$, the drop-bolt N, engaging said lug $N^2$, and the weighted pawl O, substantially as herein shown and described.

JOSEPH STANLEY MARSHALL.

Witnesses:
SOLOMON NIGHSUONGER,
LUIS MORGAN.